United States Patent
Komatsu et al.

(10) Patent No.: US 6,852,802 B1
(45) Date of Patent: Feb. 8, 2005

(54) ORGANIC POLYMER MATERIAL, PROCESS FOR PRODUCING THE SAME, AND HEAVY-METAL ION REMOVER COMPRISING THE SAME

(75) Inventors: Makoto Komatsu, Kanagawa (JP); Kazuyoshi Takeda, Kanagawa (JP); Kunio Fujiwara, Kanagawa (JP); Takeshi Takai, Kanagawa (JP)

(73) Assignee: Ebara Corporation, Tokyo (JP)

( * ) Notice: Subject to any disclaimer, the term of this patent is extended or adjusted under 35 U.S.C. 154(b) by 106 days.

(21) Appl. No.: 10/111,012

(22) PCT Filed: Oct. 20, 2000

(86) PCT No.: PCT/JP00/07321

§ 371 (c)(1),
(2), (4) Date: Apr. 19, 2002

(87) PCT Pub. No.: WO01/29104

PCT Pub. Date: Apr. 26, 2001

(30) Foreign Application Priority Data

Oct. 21, 1999 (JP) ............................................. 11/299462
Sep. 19, 2000 (JP) ...................................... 2000-283842

(51) Int. Cl.$^7$ .............................. C08F 8/26; C08F 8/30; C08F 8/42; C08J 3/28; C08J 5/20
(52) U.S. Cl. ........................... 525/240; 525/64; 525/69; 525/333.3; 525/333.6; 525/355; 525/357; 525/296; 525/374; 522/113; 522/116; 522/126; 522/123; 522/152
(58) Field of Search ............................ 525/240, 64, 69, 525/333.3, 333.6, 355, 357, 296, 374, 218; 522/113, 116, 126, 123, 152

(56) References Cited

U.S. PATENT DOCUMENTS

| | | | |
|---|---|---|---|
| 3,278,255 A | 10/1966 | Chen | |
| 4,605,685 A | 8/1986 | Momose et al. | |
| 5,071,880 A | 12/1991 | Sugo et al. | |
| 5,425,866 A | 6/1995 | Sugo et al. | |
| 5,654,379 A | * | 8/1997 | Powers et al. ............... 525/356 |
| 5,743,940 A | 4/1998 | Sugo et al. | |

FOREIGN PATENT DOCUMENTS

| | | |
|---|---|---|
| JP | 48-15461 | 5/1973 |
| JP | 50-105581 | 8/1975 |
| JP | 53-008691 | 1/1978 |
| JP | 63-135432 | 6/1988 |
| JP | 1-258740 | 10/1989 |
| JP | 2-187136 | 7/1990 |
| JP | 2-187143 | 7/1990 |
| JP | 2-187144 | 7/1990 |
| JP | 5-57281 | 3/1993 |
| JP | 5-64726 | 3/1993 |

OTHER PUBLICATIONS

Sahni et al., Coordination Chemistry Reviews, vol. 59, pp. 16–22, 1994.
Database WPI, Section Ch, Week 199512, Derwent Publications Ltd., Class A14, AN 1995–085443, XP002267692 JP 07 010925 A (Yazaki Corp), 1995 (abstract).
Patent Abstracts of Japan, vol. 1996, No. 10, 1996 & JP 8 157504 A (Asahi Chem Ind Co Ltd), 1996 (abstract).
Database WPI, Section Ch, Week 1992447, Derwent Publications Ltd., Class D15, AN 1992–386091 XP 00226769 JP 04 284853 A (Ebara Corp), 1992 (abstract).

* cited by examiner

*Primary Examiner*—Rabon Sergent
*Assistant Examiner*—Olga Asinovsky
(74) *Attorney, Agent, or Firm*—Wenderoth, Lind & Ponack, L.L.P.

(57) ABSTRACT

An object of the present invention is to provide a heavy metal ion scavenger having more excellent scavenging performance than previously. In order to attain this object, organic polymer materials of the present invention are characterized in that they have a polymer side chain derived from a haloalkyl-substituted styrene on the backbone of an organic polymer base and a functional group capable of forming a complex with a heavy metal ion has been introduced onto said polymer side chain. These organic polymer materials have excellent heavy metal ion scavenging performance so that they can be suitably used as heavy metal ion scavengers.

5 Claims, 1 Drawing Sheet

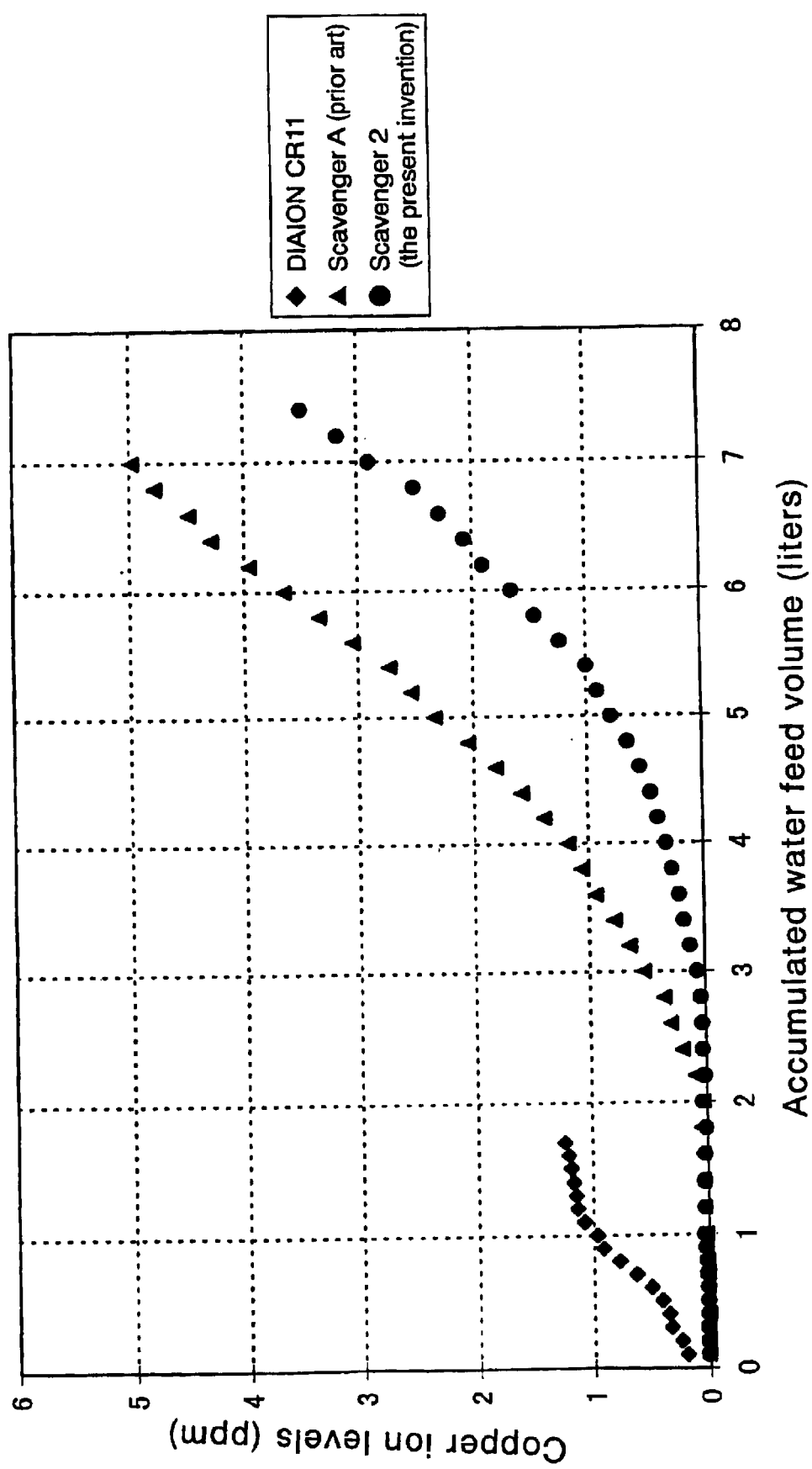

ically very stable because a polymer side chain containing a chelate group has been introduced onto the polymer backbone of a chemically stable and sufficiently mechanically strong organic polymer base. They also have the advantage that no heavy metal ions or reactants are dissipated because the chelate group on the polymer side chain reacts with a heavy metal ion to form a stable complex.

ORGANIC POLYMER MATERIAL, PROCESS FOR PRODUCING THE SAME, AND HEAVY-METAL ION REMOVER COMPRISING THE SAME

FIELD OF THE INVENTION

The present invention relates to organic polymer materials that can be used as scavengers for removing heavy metal ions such as cobalt, nickel, copper, mercury, cadmium, lead, iron, zinc or the like contained in industrial water or wastewater in the fields of precision electronic industry, medicine, pharmacy, nuclear power generation, etc.

PRIOR ART

Conventional water treatment techniques for removing heavy metal ions contained in industrial water or wastewater involve (1) precipitating target heavy metal ions as insoluble metal salts or hydroxides; (2) concentrating heavy metal ions by evaporation; (3) removing heavy metal ions by adsorption to an adsorbent; (4) removing heavy metal ions by membrane separation; (5) removing heavy metal ions by solvent extraction; (6) electrochemically depositing heavy metal ions at an electrode; or the like.

Method (1) above comprising precipitating heavy metal ions as hydroxides or the like is currently most common, but this method has problems such as difficulty in post-treatment or recovery/recycling of sludge produced, redissolution of amphoteric materials in treated water at excessively higher pH, formation of complex salts that are difficult to remove, etc. As a means to solve these problems, the use of bead-like chelate resins has become common in connection with adsorptive removal method (3) above.

However, adsorptive method with chelate resins has also the disadvantage that large amounts of resins are required because it is difficult to efficiently separate low levels of dissolved heavy metal ions by adsorption. Furthermore, this method is limited to applications using packed column systems because chelate resins are in the form of round spheres having a diameter of about 0.2–0.8 mm. This may also cause the disadvantage that the flow rate cannot be increased due to great pressure loss when a stock solution is to be continuously flown.

Moreover, bead-like chelate resins normally have a rigid three-dimensional structure due to the presence of crosslinkers such as divinylbenzene, so that heavy metal ions or regenerants cannot diffuse into the resins at sufficient speed. Therefore, removal speed of heavy metal ions or dissolution speed of heavy metal ions during regeneration of the resins is also low. In addition, these resins were practically difficult to recycle because chelate groups may be separated from the resins to diffuse or may be chemically changed under the action of regenerants during regeneration of the resins. On the other hand, they were difficult to incinerate when they were not recycled but desired to be disposable. This invites the great problem of how to reduce the volume of radioactive waste chelate resins after they are used to remove heavy metal ions in wastewater from a nuclear power plant, for example. Improper disposal of even non-radioactive waste resins may cause adsorbed heavy metal ions (eg, mercury or cadmium) to diffuse to invite serious secondary pollution.

JP-A-187143/1990 proposes a heavy metal ion scavenger to solve the above problems in which a graft polymer side chain is introduced into a polymer base by graft-polymerizing a polymerizable monomer having an epoxy group such as glycidyl methacrylate and an iminodiacetate group is immobilized as a chelate group on the graft polymer side chain. The heavy metal ion scavenger proposed here shows high adsorption performance for trace heavy metal ions in aqueous solutions.

However, there are still needs for scavengers showing further excellent heavy metal ion scavenging performance.

DISCLOSURE OF THE INVENTION

As a result of careful studies to further improve performance of heavy metal ion scavengers of the type having a polymer side chain on the backbone of an organic polymer and a functional group capable of forming a complex with a heavy metal ion on the polymer side chain, we accomplished the present invention on the basis of the finding that an organic polymer material obtained by using a polymer side chain derived from a styrene compound having a haloalkyl group on the benzene ring and introducing a functional group capable of forming a complex with a heavy metal ion onto the polymer side chain shows more excellent heavy metal ion scavenging performance than conventional heavy metal ion scavengers.

Accordingly, the present invention relates to an organic polymer material characterized in that it has a polymer side chain derived from a styrene compound having a haloalkyl group on the benzene ring on the backbone of an organic polymer base and a functional group capable of forming a complex with a heavy metal ion has been introduced onto said polymer side chain. The present invention also relates to a heavy metal ion scavenger comprising the organic polymer material.

BRIEF DESCRIPTION OF THE DRAWINGS

FIG. 1 is a graph showing the results of experiments in Example 5 performed to compare copper ion scavenging performance of a heavy metal ion scavenger comprising an organic polymer material of the present invention with those of a commercially available chelate resin and a heavy metal ion scavenger of the prior art.

THE MOST PREFERRED EMBODIMENTS OF THE INVENTION

Various aspects of the present invention are explained in detail below. The "functional group capable of forming a complex with a heavy metal ion" as defined herein is simply referred to as "chelate group" below. The "styrene compound having a haloalkyl group on the benzene ring" is also simply referred to as "haloalkyl-substituted styrene" below.

Organic polymer materials of the present invention are chemically very stable because a polymer side chain containing a chelate group has been introduced onto the polymer backbone of a chemically stable and sufficiently mechanically strong organic polymer base. They also have the advantage that no heavy metal ions or reactants are dissipated because the chelate group on the polymer side chain reacts with a heavy metal ion to form a stable complex.

In typical heavy metal ion scavengers comprising chelate resin beads, a chelate group has been introduced onto the polymer backbone of a polymer resin to confer heavy metal ion adsorbing function and those polymer backbones are crosslinked to each other to compensate for deterioration of physical strength due to introduction of this chelate group. In chelate resins, a chelate group such as iminodiacetate group has been generally introduced onto the backbone of a polystyrene obtained by polymerizing a styrene monomer. However, once these chelate groups are introduced, several water molecules are coordinated around the highly hydrophilic chelate groups to form gaps between polymer chains, whereby the resin is swollen or otherwise affected to lower the physical strength. In order to solve this problem, polystyrene backbones are crosslinked to each other with a crosslinker such as divinylbenzene in chelate resins. This enhances physical strength of the resins, but another problem occurs, that is, absorption/desorption functions such as heavy metal ion-absorbing speed or regenerant-diffusing speed are lowered by the formation of a crosslinked structure. In organic polymer materials of the present invention, a polymer side chain is provided on the polymer backbone of an organic polymer base and a chelate group is introduced onto the polymer side chain, whereby excellent heavy metal ion adsorbing/desorbing performance can be conferred on the base while maintaining the physical strength of the polymer backbone. Heavy metal ion scavengers comprising an organic polymer material of the present invention can maintain both heavy metal ion-absorbing speed and regenerant-diffusing speed at high level because they have no crosslinked structure in the polymer backbone. In organic polymer materials of the present invention, the backbone serves to hold physical strength or configuration.

In organic polymer materials of the present invention, suitable means for introducing a side chain in the form of a polymer chain onto the polymer backbone include graft polymerization. Especially, radiation-induced graft polymerization is most preferred for the purpose of the present invention, because a desired graft polymer side chain can be introduced into an organic polymer base by irradiating the base to produce a radical and reacting it with a graft monomer and the number or length of the graft chain can be relatively freely controlled and the polymer side chain can be introduced into existing polymer materials in various shapes.

Radiations that can be used in radiation-induced graft polymerization well suitable for the purpose of the present invention include α-rays, β-rays, γ-rays, electron rays, UV ray, etc., among which γ-rays and electron rays are preferred for use in the present invention. Radiation-induced graft polymerization includes preirradiation graft polymerization involving preliminarily irradiating a graft base and then bringing it into contact with a polymerizable monomer (graft monomer) for reaction, and simultaneous irradiation graft polymerization involving simultaneously irradiating a system containing a base and a monomer, and either method can be used in the present invention. Radiation-induced graft polymerization includes various manners of contact between a monomer and a base, such as liquid phase graft polymerization performed with a base immersed in a monomer solution, gas phase graft polymerization performed with a base in contact with the vapor of a monomer, or immersion gas phase graft polymerization performed by immersing a base in a monomer solution and then removing it from the monomer solution for reaction in a gas phase, and any method can be used in the present invention.

Fibers and woven/nonwoven fabrics comprising a fiber assembly are the most preferred materials for use as organic polymer bases for preparing organic polymer materials of the present invention, and are well suitable for use in the immersion gas phase graft polymerization because they tend to retain monomer solutions.

The functional chelate group capable of forming a complex with a heavy metal ion in organic polymer materials of the present invention can be any one of those known to form a complex with a heavy metal ion in the art, typically functional groups derived from iminodiacetic acid and sodium salts thereof; functional groups derived from various amino acids such as phenylalanine, lysine, leucine, valine and proline as well as sodium salts thereof; functional groups derived from iminodiethanol, etc.

The polymer side chain introduced onto the polymer backbone of an organic polymer base in organic polymer materials of the present invention is derived from a haloalkyl-substituted styrene. The polymer side chain is introduced by graft-polymerizing a haloalkyl-substituted styrene on the backbone of an organic polymer base. An example of haloalkyl-substituted styrenes preferred for use in the present invention is an halo-n-alkyl-substituted styrene represented by the formula:

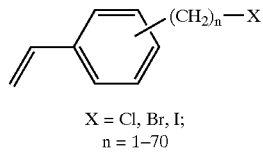

X = Cl, Br, I;
n = 1–70

Especially preferred are chloromethylstyrene represented by the formula:

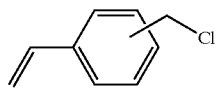

and bromoethylstyrene represented by the formula:

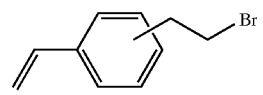

Surprisingly, heavy metal ion scavengers comprising an organic polymer material having a graft polymer side chain derived from a haloalkyl-substituted styrene according to the present invention were found to greatly improve heavy metal ion scavenging performance as compared with conventional nonwoven materials having a glycidyl methacrylate graft side chain in which the same chelate group has been introduced. The reason for this is not unknown, but this is probably because the resulting complexes have different stability constants due to the difference in steric structure between the glycidyl methacrylate graft side chain and the haloalkyl-substituted styrene graft side chain. Previous studies on improvement of ion adsorbing/desorbing performance in this field were solely focused on choice of a chelate group involved in ion adsorption/desorption and choice of the optimal density, but seldom addressed to the relation between the nature of the graft polymer side chain itself and ion adsorbing/desorbing performance. The present invention is the first finding that ion adsorbing/desorbing performance is influenced by not only choice of a chelate group involved in ion adsorption/desorption and choice of the optimal density but also the nature of the graft polymer side chain.

Organic polymer bases for preparing organic polymer materials of the present invention are preferably polyolefin-based organic polymer bases. Polyolefin-based organic polymer bases are suitable for the purpose of introducing a graft side chain by radiation-induced graft polymerization because they are not degradable by radiations. Specific examples of polyolefin-based polymer materials well suitable for use as organic polymer bases for preparing organic polymer materials of the present invention include, but not limited to, polyolefins such as polyethylene and polypropylene; halogenated polyolefins such as PTFE and polyvinyl chloride; and olefin-halogenated olefin copolymers such as ethylene-ethylene tetrafluoride copolymers and ethylene-vinyl alcohol copolymers (EVA).

These organic polymer bases can be preferably in the form of a polymer elemental fiber or a woven or nonwoven fabric comprising an assembly thereof. Fibrous polymers have a large surface area enough to remove heavy metal ions at high speed and they are light and readily formable. Specific examples of such forms include long fibers and processed products thereof, short fibers and processed products thereof as well as segments thereof. Long fibers include, for example, continuous filaments, and short fibers include, for example, staple fibers. Processed products of long and short fibers include various woven and nonwoven fabrics made from these fibers. Some woven/nonwoven fabric bases have a filter function or the like by themselves so that a multifunctional material can be formed by introducing a chelate group into a base having such a function because it can remove not only heavy metal ions but also fine particles or the like. Woven/nonwoven materials can be suitably used as bases for radiation-induced graft polymerization, and are preferred for organic polymer materials of the present invention used in the form of a filter because they and are light and easy to form into a filter. Heavy metal ion scavengers prepared from woven/nonwoven fabrics can be easily handled during disposal and readily incinerated in contrast to conventional chelate resins having a crosslinked structure that are hard to incinerate.

Organic polymer materials of the present invention can be prepared by first introducing a polymer side chain by graft-polymerizing a haloalkyl-substituted styrene onto the polymer backbone of an organic polymer base. Then, the halogen group of the polymer side chain can be replaced with a compound having a chelate group to prepare an organic polymer material of the present invention. Alternatively, organic polymer materials of the present invention can also be prepared by replacing the halogen group of the polymer side chain with a compound having a functional group capable of being converted into a chelate group and then converting the functional group into the chelate group. Compounds having a functional group capable of being converted into a chelate group include, for example, dialkyl iminodiacetate esters and alkyl esters of various amino acids. Specifically, chloromethylstyrene is first graft-polymerized onto the polymer backbone of an organic polymer base and the chloro group on the resulting polymer side chain reacted with a sulfide to form a sulfonium salt, which is then reacted with sodium iminodiacetate, whereby an organic polymer material of the present invention in which a sodium iminodiacetate group has been introduced onto the polymer side chain can be obtained. Alternatively, chloromethylstyrene is first graft-polymerized onto the polymer backbone of an organic polymer base and the chloro group on the resulting polymer side chain is replaced with iodine and then reacted with diethyl iminodiacetate ester to replace iodine with a diethyl iminodiacetate ester group, which is then converted into a sodium salt by reaction with sodium hydroxide, whereby an organic polymer material of the present invention in which a sodium iminodiacetate group has been introduced onto the polymer side chain can be obtained.

Heavy metal ion scavengers comprising an organic polymer material of the present invention can be suitably used to remove heavy metal ions in not only water but also organic media by selecting the nature of the chelate group. For example, the inventors found that heavy metal ion scavengers having a chelate group derived from iminodiethanol show more excellent heavy metal ion scavenging performance in organic media than those having an iminodiacetate group.

Heavy metal ion scavengers comprising an organic polymer material of the present invention can be used to remove various heavy metal ions. Heavy metal ions that can be removed by heavy metal ion scavengers of the present invention include cobalt, nickel, copper, mercury, cadmium, lead, iron, zinc or the like.

The following examples illustrate various specific embodiments of the present invention without, however, limiting the invention thereto.

EXAMPLE 1

A nonwoven cloth having an areal density of 50 g/m$^2$ made of a polyethylene fiber of about 10–16 $\mu$m in diameter was used as an organic polymer base. This nonwoven cloth base in an amount of 40 g was irradiated with $\gamma$-rays at 160 kGy with cooling on dry ice. This irradiated base was immersed in chloromethylstyrene (50% m-isomer, 50% p-isomer, trade name: CMS-AM from Seimi Chemical) preliminarily freed of polymerization inhibitors and reacted at 50° C. for 5 hours to give 86 g of a chloromethylstyrene-grafted nonwoven cloth at a grafting degree of 115%.

This grafted nonwoven cloth in an amount of 19.6 g was immersed in a solution of 52.5 g iminodiethanol in isopropyl alcohol (450 ml) and reacted at 70° C. for 48 hours. After reaction, the nonwoven cloth base was successively washed with pure water, 0.1 N aqueous sodium hydroxide solution and methanol, and then the solvent was wiped off and the base was dried under reduced pressure at 50° C. for 12 hours to give 23.7 g of an organic polymer material of the present invention. This is designated as heavy metal ion scavenger 1.

EXAMPLE 2

A chloromethylstyrene-grafted nonwoven cloth in an amount of 20.7 g obtained in the same manner as in Example 1 was immersed in a solution of 36 g sodium iodide in acetone (400 ml) and reacted at 50° C. for 48 hours. After reaction, the nonwoven cloth base was successively washed with pure water and acetone, and then the solvent was wiped off. Then, this nonwoven cloth was immersed in a solution of 77.8 g diethyl iminodiacetate in dimethylformamide (360 ml) and reacted at 80° C. for 48 hours. After reaction, the nonwoven cloth was washed with methanol. This nonwoven cloth was further immersed in 1N sodium hydroxide-ethanol mixed solution (200 ml+200 ml) and reacted at 80° C. for 48 hours and then repeatedly washed with pure water, and then water was wiped off and the nonwoven cloth was dried under reduced pressure at 50° C. to give 28.5 g of an organic polymer material of the present invention. This is designated as heavy metal ion scavenger 2.

COMPARATIVE EXAMPLE 1

In the same manner as in Example 1, 11.5 g of a nonwoven polyethylene cloth was irradiated with $\gamma$-rays. This was immersed in glycidyl methacrylate and subjected to graft polymerization at 60° C. for 3 hours, to give 23.0 g of a glycidyl methacrylate-grafted nonwoven cloth at a grafting degree of 100%.

This grafted nonwoven cloth in an amount of 8.0 g was immersed in a solution of 13 g sodium iminodiacetate in water-isopropanol (85 ml+85 ml) and heated at 80° C. for 24 hours. After reaction, the nonwoven cloth was successively washed with pure water, 0.2 N NaOH and pure water, and then the solvent was wiped off and the nonwoven cloth was dried under reduced pressure at 50° C. to give 11.1 g of heavy metal ion scavenger A.

EXAMPLE 3

Evaluation Tests for Copper ion Scavenging Performance of Heavy Metal Ion Scavengers in Water (Batch Tests)

An aqueous solution at 100 ppm copper ion (pH=5.15) was prepared by dissolving copper sulfate in pure water. In an Erlenmeyer flask equipped with a stopper, a 9 cm$^2$ sample of each of heavy metal ion scavengers 2 and A obtained above was immersed in 100 ml of this aqueous solution and slowly stirred at 25° C. The copper ion level in the aqueous solution was determined 5, 15, 30, 60 and 120 minutes after the scavenger was immersed. The results are shown in Table 1 below.

TABLE 1

|  | Scavenger 2 | Scavenger A |
| --- | --- | --- |
| Weight of scavenger (mg) | 168.4 | 191.2 |
| Copper ion level (ppm) |  |  |
| After 5 minutes | 31.4 | 37.0 |
| After 15 minutes | 8.75 | 15.4 |
| After 30 minutes | 0.6 | 6.9 |
| After 60 minutes | 0.13 | 1.0 |
| After 120 minutes | 0.09 | 0.6 |

Table 1 shows that a heavy metal ion scavenger comprising an organic polymer material of the present invention has remarkably excellent copper ion scavenging performance as compared with a conventional scavenger obtained by grafting glycidyl methacrylate.

EXAMPLE 4

Evaluation Tests for Copper Ion Scavenging Performance of Heavy Metal Ion Scavengers in an Organic Medium (Batch Tests)

An isopropyl alcohol solution at 5 ppm copper ion was prepared by adding 0.5 ml of an aqueous solution at 1000 ppm copper sulfate to 100 ml of isopropyl alcohol. In an Erlenmeyer flask equipped with a stopper, a 20 cm$^2$ sample of each of heavy metal ion scavengers 1 and 2 obtained above was immersed in 100 ml of this solution and slowly stirred at 25° C. The copper ion level in the solution was determined 1, 2, 6 and 24 hours after the scavenger was immersed. The results are shown in Table 2 below.

TABLE 2

|  | Scavenger 1 | Scavenger 2 |
| --- | --- | --- |
| Weight of scavenger (mg) | 341.1 | 357.3 |
| Copper ion level (ppm) |  |  |
| After 1 hour | 3.02 | 4.16 |
| After 2 hours | 2.14 | 4.10 |
| After 6 hours | 0.55 | 4.08 |
| After 24 hours | 0.10 | 4.07 |

Table 2 shows that scavenger 1 (having an iminodiethanol chelate group) has more excellent copper ion scavenging performance in an organic medium than scavenger 2 (that showed excellent copper ion scavenging performance in water).

EXAMPLE 5

Evaluation Tests for Copper Ion Scavenging Performance of Scavengers (Continuous Tests)

A stack of samples of 18 mm in diameter of heavy metal ion scavenger 2 or A obtained above or a commercially available chelate resin (DIAION CR11) were packed in a glass column having an inner diameter of 18 mm up to a bed height of 2.2 cm (bed volume 5.1 ml). This column was pretreated by passing 2 L of pure water at a flow rate of 1.27 L/h for heavy metal ion scavengers 2 and A or 0.13 L/h for DIAION. Then, an aqueous solution at 10 ppm copper ion (pH=5.4) was passed at a flow rate of 1.27 L/h (SV=250/h) and copper ion levels in treated water were determined. The results are shown in FIG. 1.

FIG. 1 shows that a heavy metal ion scavenger comprising an organic polymer material of the present invention more effectively retains copper ion scavenging performance than either a commercially available chelate resin or a conventional heavy metal ion scavenger based on glycidyl methacrylate. Moreover, copper ion can be effectively removed even at a very high flow rate as shown in this example, suggesting the possibility of greatly reduced process time and space saving in heavy metal removal.

INDUSTRIAL APPLICABILITY

Organic polymer materials of the present invention are characterized in that they have a polymer side chain derived from a haloalkyl-substituted styrene on the backbone of an organic polymer base and a chelate group has been introduced onto the polymer side chain, and therefore, these materials can attain more excellent heavy metal ion adsorbing/desorbing performance and can be suitably used as heavy metal ion scavengers because they have high physical strength and rapidly adsorb/desorb heavy metal ions and diffuse regenerants. Especially, they have greatly improved heavy metal ion scavenging performance as compared with conventional heavy metal ion scavengers having a glycidyl methacrylate-grafted side chain. They can be safely used against environmental pollution without incidentally releasing adsorbed heavy metal ions because heavy metal ions are stably coordinated to the chelate group directly linked to the polymer base via covalent bond. Spent scavengers can be reused because they can be regenerated with an alkali after dissolution of heavy metal ions with an acid. Heavy metal ion scavengers of the present invention are readily disposable by incineration or other means and lighter and less expensive as compared with conventional chelate resins. Heavy metal ion scavengers comprising an organic polymer material of the present invention can be used to effectively remove heavy metal ions in not only water but also organic media by suitably selecting the chelate group. The amount of the chelate group, the diameter of the fiber and other factors of heavy metal ion scavengers of the present invention can be appropriately selected depending on conditions such as temperature, concentration and scale because they comprise a readily formable and compact polymer material.

The present invention includes the following aspects.

1. An organic polymer material characterized in that it has a polymer side chain derived from a styrene compound having a haloalkyl group on the benzene ring on the backbone of an organic polymer base and a functional group capable of forming a complex with a heavy metal ion has been introduced onto said polymer side chain.

2. The organic polymer material as defined in 1 above wherein said organic polymer base comprises a polyolefin-based organic polymer.

3. The organic polymer material as defined in 1 or 2 wherein said organic polymer base has a form selected from fibers, woven or nonwoven fabrics comprising a fiber assembly and processed products thereof and segments thereof.

4. The organic polymer material as defined in any one of 1 to 3 wherein said polymer side chain has been introduced onto the backbone of an organic polymer base by radiation-induced graft polymerization.

5. The organic polymer material as defined in any one of 1 to 4 wherein said functional group capable of forming a complex with a heavy metal ion is a group derived from iminodiacetic acid, iminodiethanol, amino acids or a salt thereof.

6. A heavy metal ion scavenger comprising the organic polymer material as defined in any one of 1 to 5.

7. A process for preparing the organic polymer material as defined in any one of 1 to 5, comprising graft-polymerizing a styrene compound having a haloalkyl group on the benzene ring to an organic polymer base to form a polymer side chain and then introducing a functional group capable of forming a complex with a heavy metal ion onto said polymer side chain by reacting said polymer side chain with a compound having said functional group capable of forming a complex with a heavy metal ion or reacting said polymer side chain with a compound having a group capable of being converted into said functional group and then converting said group into said functional group.

What is claimed is:

1. An organic polymer material having a polymer side chain derived from a styrene compound having a haloalkyl group on the benzene ring on the backbone of an organic polymer base and a functional group capable of forming a complex with a heavy metal ion which has been introduced onto said polymer side chain.

2. The organic polymer material as defined in claim 1 wherein said polymer side chain has been introduced onto the backbone of an organic polymer base by radiation-induced graft polymerization.

3. The organic polymer material as defined in claim 1 wherein said functional group capable of forming a complex with a heavy metal ion is a group derived from iminodiacetic acid, iminodiethanol, amino acids or a salt thereof.

4. A heavy metal ion scavenger comprising the organic polymer material as defined in claim 1.

5. A process for preparing the organic polymer material as defined in claim 1, comprising graft-polymerizing a styrene compound having a haloalkyl group on the benzene ring to an organic polymer base to form a polymer side chain and then introducing a functional group capable of forming a complex with a heavy metal ion onto said polymer side chain by reacting said polymer side chain with a compound having said functional group capable of forming a complex with a heavy metal ion or reacting said polymer side chain with a compound having a group capable of being converted into said functional group and then converting said group into said functional group.

* * * * *